US009632840B2

(12) United States Patent
Chan et al.

(10) Patent No.: US 9,632,840 B2
(45) Date of Patent: Apr. 25, 2017

(54) LOAD BALANCING WITH GRANULARLY REDISTRIBUTABLE WORKLOADS

(71) Applicant: International Business Machines Corporation, Armonk, NY (US)

(72) Inventors: Yuk L. Chan, Poughkeepsie, NY (US); Christopher Cramer, Troy, NY (US); Robert G. King, Longmont, CO (US); Deepti M. Naphade, Fishkill, NY (US); Jairo A. Pava, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

(21) Appl. No.: 14/258,588

(22) Filed: Apr. 22, 2014

(65) Prior Publication Data

US 2015/0301869 A1    Oct. 22, 2015

(51) Int. Cl.
*G06F 9/50* (2006.01)
*G06F 9/455* (2006.01)

(52) U.S. Cl.
CPC ........ *G06F 9/5088* (2013.01); *G06F 9/45558* (2013.01); *G06F 9/5083* (2013.01); *G06F 2009/4557* (2013.01)

(58) Field of Classification Search
None
See application file for complete search history.

(56) References Cited

U.S. PATENT DOCUMENTS

| 6,922,832 | B2 | 7/2005 | Barnett et al. |
| 7,853,960 | B1 * | 12/2010 | Agesen ................. G06F 9/4825 718/1 |
| 8,117,613 | B2 | 2/2012 | Uyeda |

(Continued)

FOREIGN PATENT DOCUMENTS

CN    101883113 A    11/2010

OTHER PUBLICATIONS

Chen et al., "Improving Routing State Consistency and Reducing Overhead for Migration-Based Load Balance Systems in Structured Overlay Networks," Int'l Journal of Innovative Computing, Information & Control, vol. 8, No. 3B, Mar. 2012, pp. 2015-2032.

(Continued)

*Primary Examiner* — Matthew Brophy
(74) *Attorney, Agent, or Firm* — Cantor Colburn LLP; William A. Kinnaman, Jr.

(57) ABSTRACT

In one embodiment, a computer-implemented method includes receiving a plurality of tasks to be assigned to a plurality of subgroups of virtual servers. A first plurality of the tasks is assigned to a first subgroup, where the first subgroup includes two or more virtual servers. For each of the first plurality of tasks assigned to the first subgroup, a virtual server is selected within the first subgroup, and the task is assigned to the selected virtual server. A first virtual server is migrated, by a computer processor, from the first subgroup of virtual servers to a second subgroup of virtual servers, if at least one predetermined condition is met, where the migration maintains in the first subgroup at least one of the first plurality of tasks assigned to the first subgroup.

20 Claims, 3 Drawing Sheets

(56) References Cited

U.S. PATENT DOCUMENTS

| | | | |
|---|---|---|---|
| 8,332,847 B1* | 12/2012 | Hyser | G06F 9/45558 |
| | | | 718/1 |
| 8,850,434 B1* | 9/2014 | Butikofer | G06F 9/45558 |
| | | | 718/1 |
| 9,098,337 B2* | 8/2015 | Dong | G06F 9/5033 |
| 2009/0037367 A1 | 2/2009 | Wein | |
| 2009/0313614 A1 | 12/2009 | Andrade et al. | |
| 2010/0257269 A1* | 10/2010 | Clark | G06F 9/4856 |
| | | | 709/226 |
| 2011/0099403 A1* | 4/2011 | Miyata | G06F 1/32 |
| | | | 713/323 |
| 2011/0099548 A1* | 4/2011 | Shen | G06F 9/45558 |
| | | | 718/1 |
| 2011/0106949 A1* | 5/2011 | Patel | G06F 9/5077 |
| | | | 709/226 |
| 2011/0119670 A1* | 5/2011 | Sugumar | G06F 9/5088 |
| | | | 718/1 |
| 2011/0321058 A1 | 12/2011 | Schmidt | |
| 2012/0066371 A1 | 3/2012 | Patel et al. | |
| 2012/0259909 A1 | 10/2012 | Bachelor et al. | |
| 2013/0014107 A1 | 1/2013 | Kirchhofer | |
| 2013/0031550 A1* | 1/2013 | Choudhury | G06F 9/45558 |
| | | | 718/1 |
| 2013/0145364 A1* | 6/2013 | Yang | G06F 9/45558 |
| | | | 718/1 |
| 2013/0290956 A1* | 10/2013 | Kruglick | H04L 43/0852 |
| | | | 718/1 |
| 2013/0305242 A1* | 11/2013 | Wang | G06F 9/45558 |
| | | | 718/1 |
| 2014/0075433 A1* | 3/2014 | Kotton | G06F 9/45558 |
| | | | 718/1 |
| 2014/0196056 A1* | 7/2014 | Kottomtharayil | G06F 9/505 |
| | | | 718/105 |
| 2015/0121371 A1* | 4/2015 | Gummaraju | G06F 17/30194 |
| | | | 718/1 |

OTHER PUBLICATIONS

Wang et al., "AppRAISE: Application-Level Performance Management in Virtualized Server Environments," IEEE Transactions on Network and Service Management, Dec. 2009; vol. 6, No. 4, pp. 240-254.

* cited by examiner

LOAD BALANCING WITH GRANULARLY REDISTRIBUTABLE WORKLOADS

BACKGROUND

Various embodiments of this disclosure relate to load balancing and, more particularly, to load-balancing systems and methods configured to redistribute workloads.

In many cases, a set of workloads will need to be balanced among various virtual servers, such that the servers avoid being overloaded and thereby produce a slow return on work. A workload can be, for example, a transactional workload or a batch workload.

Transactional workloads are typically not processor intensive, and each transaction making up these workloads is usually short-running. More specifically, a transaction will usually complete in thirty microseconds to two minutes. Transactional workloads are routed by a load balancer to multiple virtual servers, with most work at a given time being routed to the virtual server with the highest free capacity among the multiple virtual servers. Transactional workloads tend to be predictable and are executed quickly. Because of this, reduced server capacity due to increased work or other factors tends to have a relatively small impact on workload completion times of transactions.

In one example, a load balancer routes a large number of transactions to a first virtual server that appears to have the highest free capacity from among the available virtual servers in a load-balancing system. After this routing, a processor-intensive workload may be assigned to the first virtual server or to a second virtual server sharing a hypervisor with the first virtual server. Either way, transaction processing on the first virtual server slows because the first virtual server now has less free capacity than it appeared to have at the time of routing the transactions. The load balancer then accounts for the change in free capacity and sends fewer future workloads to the first virtual server. The transactional workloads already routed to the first server will experience more delay than originally expected, but may still be completed by the first virtual server in a reasonable time period. Due to the large volume of transactions that are likely being processed by the load-balancing system, and further due to the short processing time for completing a single transaction in general, the percentage of transactions not meeting response time goals may remain small for the transactions already routed to the first virtual server. Thus, while a delay may occur, such delay may be reasonable.

In contrast to transactional workloads, batch workloads tend to run for a relatively long time each, e.g., from twenty minutes to several hours. Additionally, they can be unpredictable, and a single batch may suddenly become more processor intensive than it was initially expected to be. Thus, there is no specific pattern of processor consumption when dealing with batches.

In another example, batch workloads B1, B2, and B3 are routed to a virtual server. Initially, they consume little processing resources, so an additional batch workload B4 is sent to the same virtual server. Batches B1 and B4 suddenly begin to consume large processor capacity. Current feedback to the load balancer indicates that no new work should be sent to the virtual server. Unfortunately, the batches already sent to that virtual server will experience significant delays. Thus, due to their lack of predictability, batch workloads can present significant problems within a load-balancing system.

SUMMARY

In one embodiment of this disclosure, a computer-implemented method includes receiving a plurality of tasks to be assigned to a plurality of subgroups of virtual servers. A first plurality of the tasks is assigned to a first subgroup, where the first subgroup includes two or more virtual servers. For each of the first plurality of tasks assigned to the first subgroup, a virtual server is selected within the first subgroup, and the task is assigned to the selected virtual server. A first virtual server is migrated, by a computer processor, from the first subgroup of virtual servers to a second subgroup of virtual servers, if at least one predetermined condition is met, where the migration maintains in the first subgroup at least one of the first plurality of tasks assigned to the first subgroup.

In another embodiment, a system includes a first-level load balancer, a second-level load balancer, and a migrator. The first-level load balancer is configured to receive a plurality of tasks to be assigned to a plurality of subgroups of virtual servers, and to assign a first plurality of the tasks to a first subgroup, where the first subgroup comprises two or more virtual servers. The second-level load balancer is configured to, for each of the first plurality of tasks assigned to the first subgroup, select a virtual server within the first subgroup and assign the task to the selected virtual server. The migrator is configured to migrate a first virtual server from the first subgroup of virtual servers to a second subgroup of virtual servers, if at least one predetermined condition is met, where the migration maintains in the first subgroup at least one of the first plurality of tasks assigned to the first subgroup.

In yet another embodiment, a computer program product includes a computer readable storage medium having computer readable program code embodied thereon. The computer readable program code is executable by a processor to perform a method. The method includes receiving a plurality of tasks to be assigned to a plurality of subgroups of virtual servers. A first plurality of the tasks is assigned to a first subgroup, where the first subgroup includes two or more virtual servers. For each of the first plurality of tasks assigned to the first subgroup, a virtual server is selected within the first subgroup, and the task is assigned to the selected virtual server. A first virtual server is migrated from the first subgroup of virtual servers to a second subgroup of virtual servers, if at least one predetermined condition is met, where the migration maintains in the first subgroup at least one of the first plurality of tasks assigned to the first subgroup.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
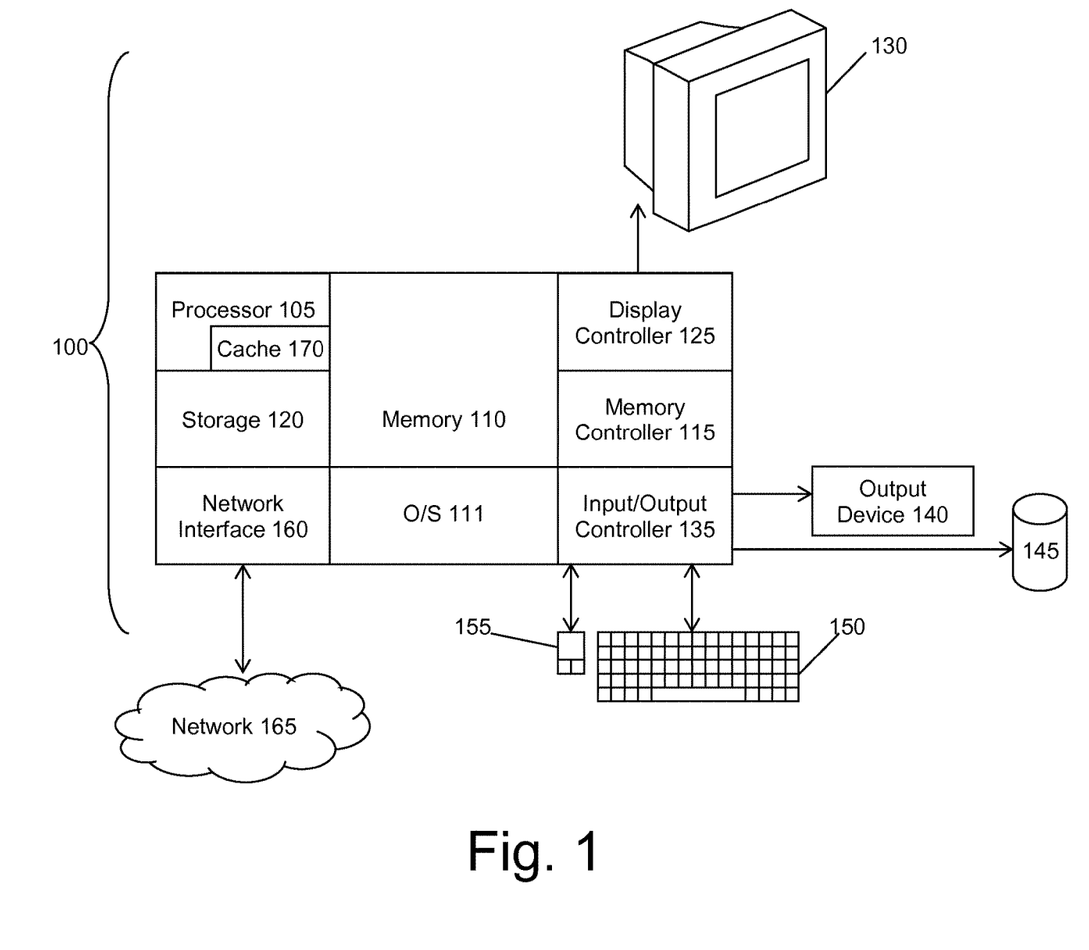
FIG. 1 is a block diagram of an exemplary computing device for implementing some or all aspects of a load-balancing system, according to some embodiments of this disclosure.

FIG. 1 illustrates a block diagram of a computer system 100 for use in implementing a load-balancing system or method according to some embodiments. The load-balancing systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input devices 145 and/or output devices 140, such as peripherals, that are communicatively coupled via a local I/O controller 135. These devices 140 and 145 may include, for example, a printer, a scanner, a microphone, and the like. A conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the load-balancing systems and methods of this disclosure.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Load-balancing systems and methods according to this disclosure may be embodied, in whole or in part, in computer program products or in computer systems 100, such as that illustrated in FIG. 1.

Figure 2:
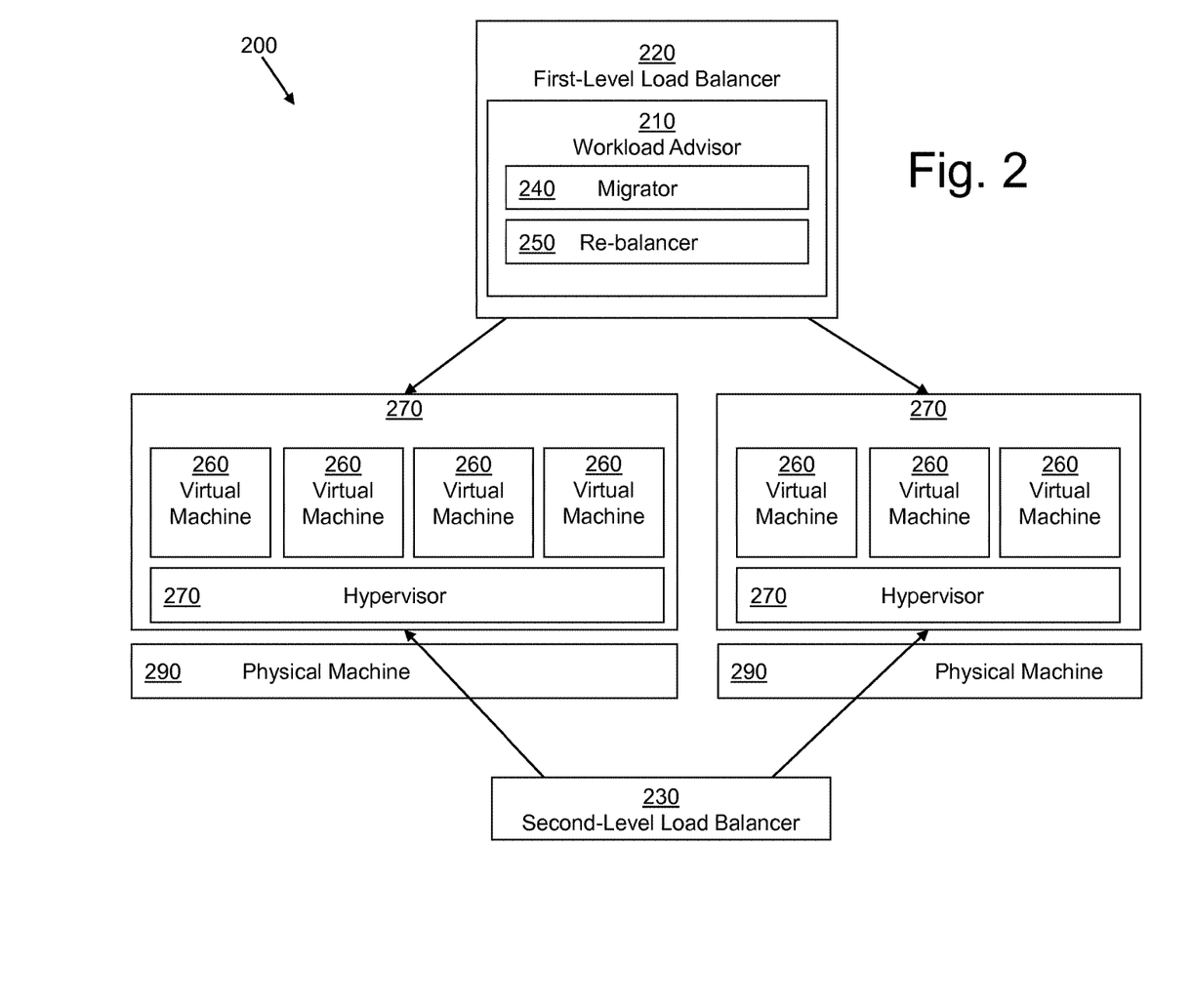
FIG. 2 is a block diagram of the load-balancing system, according to some embodiments of this disclosure.

FIG. 2 is a block diagram of a load-balancing system 200, according to some embodiments of this disclosure. As shown, the load-balancing system 200 may include a workload advisor 210, a first-level load balancer 220, a second-level load balancer 230, a migrator 240, and a re-balancer 250. In some embodiments, one or both of the migrator 240 and the re-balancer 250 may be integrated into the workload advisor 210. Further, in some embodiments, the workload advisor 210, the second-level load balance 230, or both may be integrated into the first-level load balancer 220.

The load-balancing system 200 may operate on a group of virtual servers 260, organized into subgroups 270 of virtual servers 260. The virtual servers 260 may run atop hypervisors 280, each of which runs on a lower-level machine 280, such as a computer system 100 of FIG. 1. Each hypervisor 280 may operate beneath one or more subgroups 270 of virtual servers 260, and may further run additional virtual servers not associated with the load-balancing system 200. In some embodiments, a hypervisor 280 may run beneath only a single subgroup 270 of virtual servers 260, which may be the only such subgroup 270 on the hypervisor's machine 280. This need not be the case, however.

The load-balancing system 200 may provide more effective and fine-tuned load balancing of batch workloads than can be provided by conventional load balancing. Simply combining conventional load balancing with automatic virtual server 260 migration, when a virtual server 260 is overloaded, may not be enough to sufficiently reduce the effects of delays due to resource contentions arising from batch workload processing.

Various embodiments of the load-balancing system 200 may enable workloads assigned to a single entity to be split and partially migrated to different hardware. Conventional load-balancing systems have only a first-level load balancer and no second level of load balancing for finer tuning. Thus, server migration requires moving a virtual server 260, which was assigned work directly from the first-level load balancer 220, to a different machine along with all the batch workloads assigned to that virtual server 260.

According to some embodiments of the load-balancing system 200, however, the second-level load balancer 230 enables only a portion of the work assigned to a single entity by the first-level load balancer 220 to be migrated to another machine 290. This is enabled through the use of the subgroups 270. The first-level load balancer 220 may assign work to an entire subgroup 270 instead of to individual virtual servers 260, thereby treating the subgroup 270 as a single entity. Additional controls, such as those provided by the migrator 240 and the re-balancer 250, may move virtual servers 260 between subgroups 270 to keep the subgroups balanced and operating within available capacity, as described further below. When a virtual server 260 is migrated, the migration moves only a portion of the batch workloads assigned to the subgroup 270 of that virtual server 260. Specifically, the migration may move only those workloads assigned specifically to the virtual server 260 by the second-level load balancer 230. The result is an ability to tune balancing more finely than conventionally allowed. The load-balancing system 200 may have the effect of treating a subgroup 270 like a virtual machine whose work can be divided up as needed (i.e., by moving the virtual servers 260 and their associated workloads between subgroups 270).

The first-level load balancer 220 may distribute work to the various subgroups 270 based on a load-balancing algorithm. In some embodiments, the first-level load balancer 220 may behave as a weight-based load balancer, where the load-balancing algorithm used is based on weights assigned to the subgroups 270. In that case, weights may be assigned to the subgroup 270 based on the various statuses of the subgroups 270, in a manner the same as, or similar to, the assignment of weights to virtual servers in traditional load balancing. Due to the two levels of assignments being made, however, additional factors may be considered in assigning weights as compared to weight-assignments in conventional load balancing.

In some embodiments, the weights may be assigned by the workload advisor 210, which may receive feedback from the subgroups 270 regarding utilization of resources by the subgroups 270 and by individual virtual servers 260. In its load-balancing algorithm, the first-level load balancer 220 may consider the quantity of virtual servers 260 in each subgroup 270, possibly in addition to traditional load-balancing considerations. Subgroups 270 with greater numbers of virtual servers 260 may be given favor in assignments, and as a result, these subgroups 270 may be more likely to receive workloads. In some embodiments, each subgroup 270 may be assigned a target quantity of virtual servers 260. Calculation of the target quantities will be described further below. In some further embodiments, subgroups 270 with a greater number of virtual servers 260 than their target quantities may be favored when work is being assigned, and may thus be more likely to receive work as compared to other subgroups 270.

The second-level load balancer 230 may behave as a capacity balancer, and may assign work to specific virtual servers 260 after such work has been assigned to subgroups 270 by the first-level load balancer 220. When work is assigned to a first subgroup 270, the second-level load balancer 230 may assign that work to a virtual server 260 within that first subgroup 270. A second-level algorithm may be used for this purpose. The second-level algorithm may vary based on implementation. Generally, this algorithm may seek to achieve the target quantity of virtual servers 260 per subgroup 270, and may further seek to keep the quantity of workloads assigned to, and not yet completed by, each virtual server 260 to below a predefined threshold.

To maintain the target quantity of virtual servers 260 within a subgroup 270, the second-level load balancer 230 may keep track of the current quantity of virtual servers 260 in each subgroup 270. If a subgroup's current quantity exceeds the target quantity, the second-level load balancer 230 may select a virtual server 260 within the subgroup 270 to be migrated to a different subgroup 270. For example, the second-level load balancer 230 may select the virtual server 260 with the greatest free capacity within the subgroup 270. As used herein, the term "free capacity" refers to computing resources available but not yet used. The second-level load balancer 230 may stop assigning workloads to the selected virtual server 260. As a result, some or all capacity on the selected virtual server 260 may be freed eventually, thus enabling eventual migration of the selected virtual server 260 to another subgroup 270 without affecting current workloads.

Additionally, in assigning workloads, the second-level load balancer 230 may disfavor virtual servers 260 that have quantities of outstanding workloads (i.e., not yet completed) above a predefined threshold quantity of workloads. This disfavoring may include no longer assigning work to such virtual servers 260, or it may include simply considering this factor and thus reducing the likelihood that workloads will be assigned to such virtual servers 260.

The migrator 240, which may be integrated into the workload advisor 210 in some embodiments, may migrate virtual servers 260 between subgroups 270, and thus between machines 290. The migrator 240 may determine which virtual servers 260 are to be migrated and when such migrations are to occur, based at least in part on resource availability, policy goals, or other factors. The migrator 240 may also determine a destination subgroup 270, i.e., the subgroup 270 to receive a virtual server 260 being migrated, for each migration. In some embodiments, the migrator 240 may run periodically to migrate virtual servers 260 as needed.

The migrator 240 may identify a virtual server 260 to be migrated based, for example, at least in part on completion delay. Completion delay may be defined in various ways. For example, and not by way of limitation, such delay may be defined as the time passed between the last two completed jobs. If a virtual server 260 is completing jobs slowly, and thus with large delay, this time-passed number will be high. In some embodiments, a predetermined amount of delay may be used as a threshold, where virtual servers 260 exceeding this threshold may become candidates for migration.

In choosing a virtual server 260 to migrate, the migrator 240 may also consider each subgroup's utilization of the capacity guaranteed to be available to that subgroup 270.

Each subgroup 270 may be guaranteed a certain capacity, based, for example, on a contract with a service provider of the virtual resources associated with that subgroup 270. If a subgroup 270 has high utilization of that guaranteed capacity, then its virtual servers 260 may be candidates for migration, so as to reduce that utilization. Thus, the migrator 240 may select virtual servers 260 for migration based at least in part on a combination of virtual server completion delay and subgroup resource utilization. The specific algorithm used to select virtual servers 260 for migration may be implementation dependent. In some embodiments, for example, the migrator may select the subgroup 270 with the highest utilization (e.g., lowest free capacity, or lowest percentage of guaranteed capacity that is free), and then select the virtual server 260 within that subgroup with the highest server completion delay.

To perform a migration, the migrator 240 may select a destination subgroup 270 to receive the virtual server 260 being migrated from the source subgroup 270, i.e., the virtual server's current subgroup 270. The destination subgroup 270 may be a subgroup 270 other than the one to which the virtual server 260 currently belongs. To select the destination subgroup 270, the migrator 240 may examine one or more of the other subgroups 270 (i.e., other than the virtual server's current subgroup). For each other subgroup 270, the migrator 240 may determine the completion delay for the subgroup as a whole, free capacity percentage of the guaranteed capacity, and the difference in the completion delay between the subgroup 270 being examined and the source subgroup 270. In one embodiment, the migrator may use the following selection algorithm to select a destination subgroup 270: (1) select 20% of the other subgroups 270, where those selected have the smallest difference in completion delay as compared to the source subgroup 270; (2) from that 20%, select as the destination subgroup 270 the other subgroup 270 with maximum free capacity or free capacity percentage; and (3) identify a virtual server 260 within the source subgroup 270 that should be migrated. It will be understood that a percentage other than 20% may be used, depending on implementation.

In some embodiments, the migrator may also consider importance values of the various other subgroups 270 when selecting a destination subgroup 270. Each subgroup 270 may be associated with an importance value, which may be assigned by an administrator or by some other mechanism. The importance value of a subgroup may indicate how important it is that the subgroup 270 complete tasks in a timely manner. Thus, tasks with high importance values may be disfavored when the migrator 240 seeks to select a destination subgroup 270, so as to allow highly important subgroups 270 to operate with significant free capacity.

The migrator 240 may select the source subgroup 270 before the destination subgroup 270, or may select the destination subgroup 270 first, depending on implementation. After both subgroups 270 are selected, and the virtual server 260 to be migrated is selected from within the source subgroup 270, the migrator 240 may migrate the selected virtual server 260 from the source subgroup 270 to the destination subgroup 270. In some embodiments, the source and destination subgroups 270 may be selected such that the destination subgroup's free capacity may exceed the source subgroup's free capacity plus the capacity used by the virtual server 260 to be migrated. As a result, the free capacity of the source subgroup 270 may be increased, and the migrated virtual server's completion time may also be increased by being moved to a subgroup 270 with greater free capacity.

The re-balancer 250 may balance the quantity of virtual servers 260 among the various subgroups 270. More specifically, the re-balancer 250 may seek to maintain a target quantity of virtual servers 260 in each subgroup 270. This target quantity may vary across subgroups 270, such that each subgroup 270 has its own associated target quantity. In some embodiments, for a particular subgroup 270, the target quantity may be based on the guaranteed capacity (G) for that subgroup 270 and the average number of workloads (B) assigned to that subgroup 270 in a given time period (e.g., one hour). The average number of workloads may be calculated by estimation or based on historical data. More specifically, the target quantity of virtual servers 260 for the $i^{th}$ subgroup 270 of n total subgroups may be, for example:

$$\frac{B_i * G_i}{f * \sum_{j=1}^{n} G_j}$$

In the above formula, f represents a scaling factor, which may be based on the environment and tuned as needed for the desired results. In some embodiments, the factor f may be less than 1.

Periodically, the re-balancer 250 may determine which subgroups 270 have a greater number or lesser number of virtual servers 260 than their respective target quantities. The re-balancer 250 may seek to migrate virtual servers 260 away from subgroups 270 having more virtual servers 260 than their targets, and to migrate virtual servers 260 to subgroups 270 having fewer virtual servers 260 than their targets. For an identified source subgroup 270 having too many virtual servers 260 as compared to its target, the re-balancer 250 may seek a destination subgroup 270 having too few virtual servers 260 as compared to its own target and also having available guaranteed resources no less than those utilized by at least one virtual server 260 in the source subgroup 270. If such a source subgroup 270 and destination subgroup 270 are identified, the re-balancer 250 may identify a virtual server 260 in the source subgroup 270 having a utilization no greater than the destination subgroup's free capacity. The re-balancer 250 may then migrate the selected virtual server 260 from the source subgroup 270 to the destination subgroup 270.

In some instances, tasks of the migrator 240 and the re-balancer 250 may be combined. For example, two virtual servers 260 are swapped between subgroups 270. This can occur in the following example, without limitation: A batch job on a first virtual server 260 begins consuming processor resources, such that the first virtual server 260 causes contention for the capacity allocated to a first subgroup 270 on a first machine 290, which may be a physical server, such as a blade server. As a result, various virtual servers 260 in the first subgroup 270 may experience delays. On a second machine, however, there is no contention for resources. A second virtual server 260 on the second machine 250 has been assigned a set of outstanding batch workloads, which together are using less processor resources than the second virtual server 260 is entitled to use as its share of the guaranteed resources of its subgroup 270 on the second machine 250. Additionally, total utilization of resources in the second subgroup 270 is below the total guaranteed capacity allocated to it. When the load-balancing system 200 becomes aware that (1) the first virtual server 260 in the first subgroup 270 is consuming a large amount of processing resources, (2) the second virtual machine in the second subgroup 270 is consuming less processing resources than its share, and (3) the second subgroup 270 is operating below capacity, load-balancing system 200 may swap the first and second virtual servers 260. Assuming variable work but similar virtual server configuration, this swap may move the free capacities of the two subgroups 270 closer to each other. After the swap, load balancing and virtual server migration may continue as before, according to this disclosure.

Figure 3:
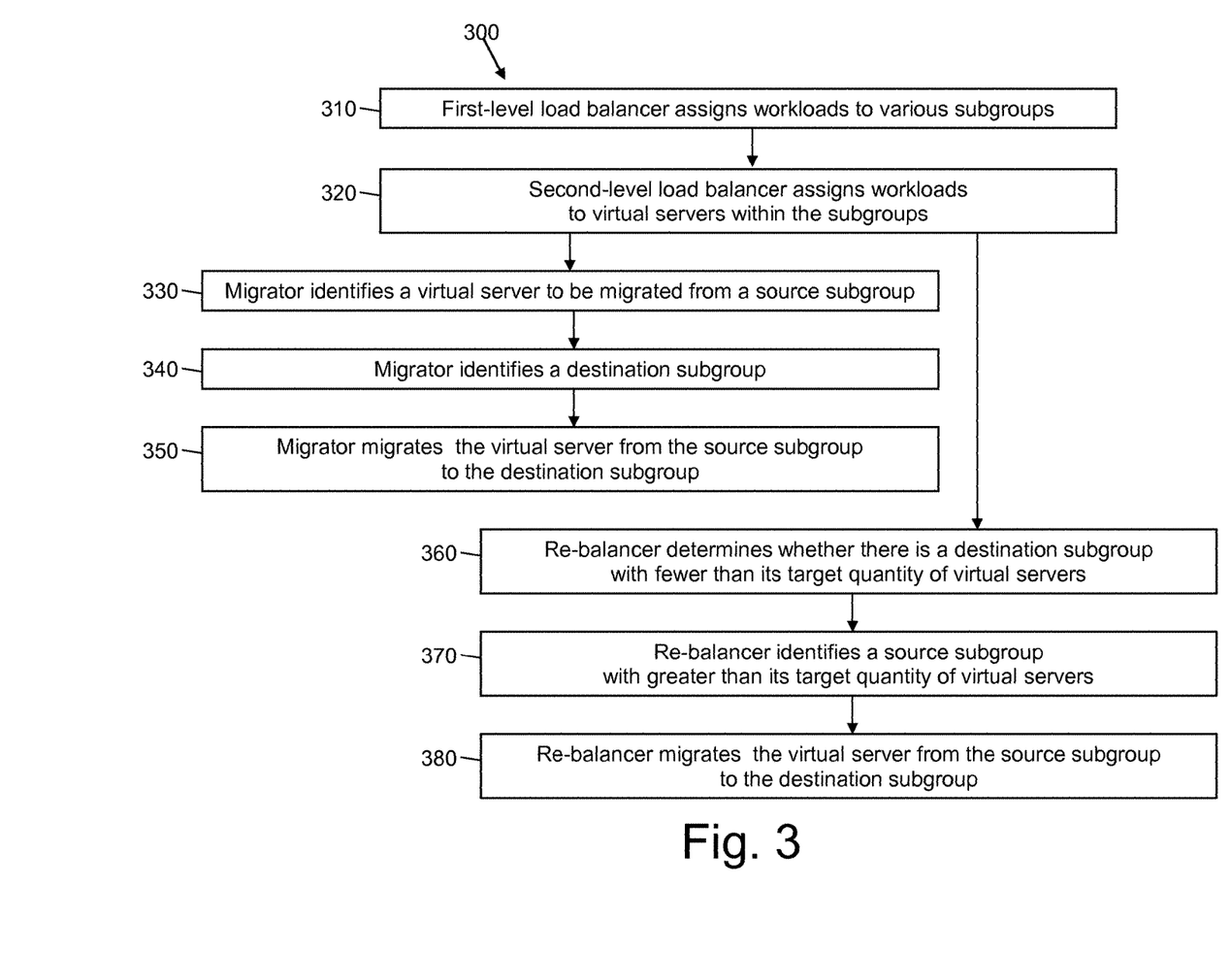
FIG. 3 is a flow diagram of a method for balancing workloads across a set of subgroups, where each subgroup includes two or more virtual servers, according to some embodiments of this disclosure.

FIG. 3 is a flow diagram of a method 300 for balancing workloads across a set of subgroups 270, where each subgroup 270 includes two or more virtual servers 260. As shown, at block 310, the first-level load balancer 220 may assign work to the various subgroups 270. At block 320, the second-level load balancer 230 may assign each workload to a virtual server 260 within the subgroup 270 to which the workload was assigned. It will be understood that the activities of blocks 310-320 continue throughout the remainder of the method 300, whenever new work is received. A block 330, the migrator 240 may identify a virtual server 260 to be migrated. The migrator 240 may attempt to identify such virtual servers 260 periodically. When such a virtual server 260 is identified, then at block 340, the migrator 240 may identify a destination subgroup 270 for receiving the virtual server 260. At block 350, the migrator 240 may migrate the virtual server 260 from its current source subgroup 270 to the destination subgroup 270. Periodically, the re-balancer 250 may determine whether a destination subgroup 270 exists with fewer than its respective target quantity of virtual servers 260, as shown at block 360. If such a destination subgroup 270 is found, then at block 370, the re-balancer 250 may identify a source subgroup 270 having a greater number of virtual servers 260 than its respective target quantity. At block 380, the re-balancer 250 may then migrate a virtual server 260 from the source subgroup 270 to the destination subgroup 270. It will be understood that the migrator 240 and the re-balancer 250 may perform these tasks in parallel with each other, and further in parallel with work assignments provided by the first-level load balancer 220 and the second-level load balancer 230.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented, comprising:
receiving a plurality of tasks to be assigned to a plurality of subgroups of virtual servers, wherein the plurality of subgroups of virtual servers runs atop a hypervisor, wherein the hypervisor runs on a physical server;
assigning a first plurality of the tasks to a first subgroup of virtual servers, wherein the first subgroup of virtual servers comprises two or more virtual servers;
for each of the first plurality of tasks assigned to the first subgroup of virtual servers, selecting a virtual server within the first subgroup of virtual servers and assigning the task to the selected virtual server;
migrating, by a computer processor, a first virtual server from the first subgroup of virtual servers to a second subgroup of virtual servers if at least one predetermined condition is met, wherein the migration maintains in the first subgroup of virtual servers at least one of the first plurality of tasks assigned to the first subgroup of virtual servers; and
calculating a first target quantity of virtual servers to be maintained in the first subgroup of virtual servers, wherein the first target quantity of virtual servers is based on a guaranteed capacity for the first subgroup of virtual servers and an average number of workloads assigned to the first subgroup of virtual servers.

2. The method of claim 1, wherein the at least one of the first plurality of tasks maintained in the first subgroup of virtual servers comprises one or more tasks assigned to other virtual servers within the first subgroup of virtual servers.

3. The method of claim 1, wherein migrating the first virtual server decreases a completion delay of the first subgroup of virtual servers.

4. The method of claim 1, further comprising selecting the second subgroup of virtual servers as a destination subgroup for the migration of the first virtual server, wherein the second subgroup of virtual servers has a free capacity that is no less than a utilization of the first virtual server in the first subgroup of virtual servers combined with a free capacity of the first subgroup of virtual servers.

5. The method of claim 1, further comprising
calculating a second target quantity of virtual servers to be maintained in the second subgroup of virtual servers.

6. The method of claim 5, wherein migrating the first virtual server moves the quantities of virtual servers in both the first subgroup of virtual servers and the second subgroup of virtual servers closer to their respective target quantities of virtual servers.

7. The method of claim 5, wherein the first target quantity for the first subgroup of virtual servers is based on at least one of a guaranteed capacity allotted to the first subgroup of virtual servers and a quantity of workloads assigned to the first subgroup of virtual servers.

8. A system comprising:
a first-level load balancer configured to receive a plurality of tasks to be assigned to a plurality of subgroups of virtual servers and to assign a first plurality of the tasks to a first subgroup of virtual servers, wherein the first subgroup of virtual servers comprises two or more virtual servers;
a second-level load balancer configured to, for each of the first plurality of tasks assigned to the first subgroup of virtual servers, select a virtual server within the first subgroup of virtual servers and assign the task to the selected virtual server;
a migrator configured to migrate a first virtual server from the first subgroup of virtual servers to a second subgroup of virtual servers if at least one predetermined condition is met, wherein the migration maintains in the first subgroup of virtual servers at least one of the first plurality of tasks assigned to the first subgroup of virtual servers; and a re-balancer configured to calculate a first target quantity of virtual servers to be maintained in the first subgroup of virtual servers, wherein the first target quantity of virtual servers is based on a guaranteed capacity for the first subgroup of virtual servers and an average number of workloads assigned to the first subgroup of virtual servers, wherein the plurality of subgroups of virtual servers runs atop a hypervisor, wherein the hypervisor runs on a physical server.

9. The system of claim 8, wherein the at least one of the first plurality of tasks maintained in the first subgroup of virtual servers comprises one or more tasks assigned to other virtual servers within the first subgroup of virtual servers.

10. The system of claim 8, wherein migrating the first virtual server decreases a completion delay of the first subgroup of virtual servers.

11. The system of claim 8, wherein the migrator is further configured to select the second subgroup of virtual servers as a destination subgroup of virtual servers for the migration of the first virtual server, wherein the second subgroup of virtual servers has a free capacity that is no less than a utilization of the first virtual server in the first subgroup combined with a free capacity of the first subgroup of virtual servers.

12. The system of claim 8, wherein the re-balancer is further configured to calculate a second target quantity of virtual servers to be maintained in the second subgroup of virtual servers.

13. The system of claim 12, wherein migrating the first virtual server moves the quantities of virtual servers in both the first subgroup of virtual servers and the second subgroup of virtual servers closer to their respective target quantities of virtual servers.

14. The system of claim 12, wherein the first target quantity for the first subgroup of virtual servers is based on at least one of a guaranteed capacity allotted to the first subgroup of virtual servers and a quantity of workloads assigned to the first subgroup of virtual servers.

15. A computer program product comprising a computer readable storage medium having non-transitory computer readable program code embodied thereon, the computer readable program code executable by a processor to perform a method comprising:

receiving a plurality of tasks to be assigned to a plurality of subgroups of virtual servers, wherein the plurality of subgroups of virtual servers runs atop a hypervisor, wherein the hypervisor runs on a physical server;

assigning a first plurality of the tasks to a first subgroup of virtual servers, wherein the first subgroup of virtual servers comprises two or more virtual servers;

for each of the first plurality of tasks assigned to the first subgroup of virtual servers, selecting a virtual server within the first subgroup of virtual servers and assigning the task to the selected virtual server; and migrating a first virtual server from the first subgroup of virtual servers to a second subgroup of virtual servers if at least one predetermined condition is met, wherein the migration maintains in the first subgroup of virtual servers at least one of the first plurality of tasks assigned to the first subgroup of virtual servers without migrating the at least one of the first plurality of tasks assigned to the first subgroup of virtual servers; and calculating a first target quantity of virtual servers to be maintained in the first subgroup of virtual servers, wherein the first target quantity of virtual servers is based on a guaranteed capacity for the first subgroup of virtual servers and an average number of workloads assigned to the first subgroup of virtual servers.

16. The computer program product of claim 15, wherein the at least one of the first plurality of tasks maintained in the first subgroup of virtual servers comprises one or more tasks assigned to other virtual servers within the first subgroup of virtual servers.

17. The computer program product of claim 15, wherein migrating the first virtual server decreases a completion delay of the first subgroup of virtual servers.

18. The computer program product of claim 15, the method further comprising selecting the second subgroup of virtual servers as a destination subgroup of virtual servers for the migration of the first virtual server of virtual servers, wherein the second subgroup has a free capacity that is no less than a utilization of the first virtual server in the first subgroup of virtual servers combined with a free capacity of the first subgroup of virtual servers.

19. The computer program product of claim 15, the method further comprising calculating a second target quantity of virtual servers to be maintained in the second subgroup of virtual servers;

wherein migrating the first virtual server moves the quantities of virtual servers in both the first subgroup of virtual servers and the second subgroup of virtual servers closer to their respective target quantities of virtual servers.

20. The computer program product of claim 19, wherein the first target quantity for the first subgroup of virtual servers is based on at least one of a guaranteed capacity allotted to the first subgroup of virtual servers and a quantity of workloads assigned to the first subgroup of virtual servers.

* * * * *